United States Patent
Zhang

(10) Patent No.: US 12,269,381 B2
(45) Date of Patent: Apr. 8, 2025

(54) BASE STRUCTURE ADAPTED FOR A SEAT BODY OF A CHILD SAFETY SEAT

(71) Applicant: BAMBINO PREZIOSO SWITZERLAND AG, Steinhausen (CH)

(72) Inventor: Da Liang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 139 days.

(21) Appl. No.: 18/249,012

(22) PCT Filed: Oct. 20, 2021

(86) PCT No.: PCT/EP2021/079054
§ 371 (c)(1),
(2) Date: Apr. 13, 2023

(87) PCT Pub. No.: WO2022/084377
PCT Pub. Date: Apr. 28, 2022

(65) Prior Publication Data
US 2023/0415623 A1    Dec. 28, 2023

(30) Foreign Application Priority Data
Oct. 20, 2020  (CN) .......................... 202011128258.1

(51) Int. Cl.
*B60N 2/28*  (2006.01)
(52) U.S. Cl.
CPC ......... *B60N 2/2869* (2013.01); *B60N 2/2824* (2013.01); *B60N 2/2827* (2013.01)
(58) Field of Classification Search
None
See application file for complete search history.

(56) References Cited

U.S. PATENT DOCUMENTS

| 4,936,629 A | 6/1990 | Young |
| 5,183,312 A * | 2/1993 | Nania ................. B60N 2/2821 248/425 |

(Continued)

FOREIGN PATENT DOCUMENTS

| CN | 105966447 A | 9/2016 |
| CN | 207790408 U | 8/2018 |

(Continued)

OTHER PUBLICATIONS

PCT Notification of Transmittal of The International Search Report and the Written Opinion of the International Searching Authoritiy, or the Declaration; International Application No. PCT/EP2021/079054; International Filing Date: Oct. 20, 2021; Date of Mailing: Feb. 4, 2022; pp. 1-10.

(Continued)

*Primary Examiner* — David E Allred
(74) *Attorney, Agent, or Firm* — CANTOR COLBURN LLP

(57) ABSTRACT

A base structure (100) adapted for a seat body of a child safety seat is provided and includes a first base (1), a second base (2), a locking component (3) and a releasing mechanism (4). The second base (2) is pivotally connected to the first base (1) and located above the first base (1). A locking hole (21) is formed on a bottom portion of the second base (2). The locking component (3) is slidably disposed on the first base (1). An end of the locking component (3) is for engaging with an end of the locking hole (21). An end of the releasing mechanism (4) is located inside the second base (2) and slidably disposed on another end of the locking hole (21). The releasing mechanism (4) is operated to push the locking component (3) to disengage from the locking hole (21) for unlocking the second base (2), so as to allow the second base (2) to pivot relative to the first base (1).

14 Claims, 7 Drawing Sheets

(56) References Cited

U.S. PATENT DOCUMENTS

| | | | | |
|---|---|---|---|---|
| 6,793,283 B1* | 9/2004 | Sipos | .................. | B60N 2/2806 |
| | | | | 297/256.12 |
| 10,688,892 B2 | 6/2020 | Anderson et al. | | |
| 2006/0197364 A1* | 9/2006 | Bendure | .............. | B60N 2/2869 |
| | | | | 297/250.1 |
| 2009/0085367 A1* | 4/2009 | Downey | ................ | B60N 2/146 |
| | | | | 296/65.15 |
| 2009/0091167 A1* | 4/2009 | Jha | ..................... | B60N 2/42709 |
| | | | | 297/256.12 |
| 2017/0355287 A1 | 12/2017 | Anderson et al. | | |
| 2018/0264977 A1* | 9/2018 | Anderson | ............ | B60N 2/2878 |
| 2019/0077282 A1 | 3/2019 | Reaves et al. | | |
| 2022/0048415 A1* | 2/2022 | Keegan | .................. | B60N 2/268 |
| 2023/0256875 A1* | 8/2023 | Zhang | .................. | B60N 2/2824 |
| | | | | 297/256.12 |
| 2023/0271534 A1* | 8/2023 | Lawrence | ............ | B60N 2/2821 |
| | | | | 297/183.2 |
| 2024/0001817 A1* | 1/2024 | Zhang | ................. | B60N 2/2821 |
| 2024/0278696 A1* | 8/2024 | Mo | ....................... | B60N 2/2821 |

FOREIGN PATENT DOCUMENTS

| | | |
|---|---|---|
| CN | 108621880 A | 10/2018 |
| CN | 109606215 A | 4/2019 |
| CN | 110370993 A | 10/2019 |
| CN | 111278677 A | 6/2020 |
| CN | 111483362 A | 8/2020 |
| CN | 111516563 A | 8/2020 |
| CN | 211543319 U | 9/2020 |
| CN | 211684780 U | 10/2020 |
| CN | 113910992 A | 1/2022 |
| CN | 115782712 A | 3/2023 |
| JP | 3201637 U | 12/2015 |
| KR | 20120011317 A | 2/2012 |
| NO | 20170498 A1 | 9/2018 |
| TW | M267103 | 6/2005 |
| TW | 201006700 A1 | 2/2010 |
| TW | 202216501 A | 5/2022 |
| WO | 2019046990 A1 | 3/2019 |

OTHER PUBLICATIONS

Tao et al.; "Design and Analysis on A Quick Linkage Mechanism"; China Academic Journal Electronic Publishing House; Year 2018; 3 pages.

Chinese Application No. 2020111282581; 1st Office Action with English translation dated Nov. 6, 2023; 15 pages.

Chinese Application No. 2020111282581; Notice of Allowance with English translation dated May 21, 2024; 6 pages.

* cited by examiner

BASE STRUCTURE ADAPTED FOR A SEAT BODY OF A CHILD SAFETY SEAT

CROSS REFERENCE TO RELATED APPLICATIONS

This application is a National Stage application of PCT/EP2021/079054, filed Oct. 20, 2021, which claims the benefit of Chinese Application No. 202011128258.1, filed Oct. 20, 2020, both of which are incorporated by reference in their entirety herein.

FIELD OF THE INVENTION

The present application relates to a base structure adapted for a seat body of a child safety seat according to the pre-characterizing clause of claim 1.

BACKGROUND OF THE INVENTION

With improvement of people's living standards, child safety seats are widely used in families with children. The child safety seat is a device configured to be installed on a car and for allowing a child to sit therein to ensure the child's riding safety. The conventional child safety seat includes a base portion installed on a car, and a seat portion installed on the base portion. However, after the base portion is installed on the car and the seat portion is installed on the base portion, an orientation of the seat portion is fixed. When it is desired to place the child into the seat portion, the orientation of the seat portion cannot be adjusted for providing easy access. Furthermore, the orientation of the seat portion only can be adjusted by re-installation of the seat portion and or the base portion. Therefore, it is inconvenient in use.

SUMMARY OF THE INVENTION

Therefore, the present application aims to provide a base structure adapted for a seat body of a child safety seat for easy adjustment of an orientation of the seat body.

This is achieved by a base structure adapted for a seat body of a child safety seat according to claim 1. The dependent claims pertain to corresponding further developments and improvements.

As will be seen more clearly from the detail description, the claimed base structure is adapted for a seat body of a child safety seat and includes a first base, a second base, at least one locking component and at least one releasing mechanism. The second base is pivotally connected to the first base and located above the first base. At least one locking hole is formed on a bottom portion of the second base. The at least one locking component is slidably disposed on the first base. An end of the at least one locking component is configured to engage with an end of the at least one locking hole. An end of the at least one releasing mechanism is located inside the second base and slidably disposed inside another end of the at least one locking hole. The at least one releasing mechanism is operated to push the at least one locking component to disengage from the at least one locking hole.

According to an embodiment of the present application, the at least one releasing mechanism includes a pushing component and an operating assembly. The pushing component is slidably disposed inside the another end of the at least one locking hole and located above the at least one locking component. The operating assembly is disposed on the second base. An end of the pushing component is connected to the operating assembly, and the operating assembly is configured to drive the pushing component to slide.

According to an embodiment of the present application, the operating assembly includes a driving component. The driving component is slidably disposed on the second base. A driving inclined slot is formed on the driving component and for slidably cooperating with the pushing component. The driving component drives the pushing component to slide to push the at least one locking component by a sliding cooperation of the driving inclined slot and the pushing component when the driving component slides relative to the second base.

According to an embodiment of the present application, a sliding direction of the driving component is perpendicular to a sliding direction of the pushing component.

According to an embodiment of the present application, the operating assembly further includes a handle and a linking component. The handle is pivotally connected to the second base. The driving component is located inside the second base. The linking component is connected between the handle and the driving component. The handle drives the driving component to slide relative to the second base by the linking component.

According to an embodiment of the present application, the operating assembly further includes a recovering component disposed between the driving component and the second base.

According to an embodiment of the present application, the at least one releasing mechanism includes a button, the button is slidably disposed inside the at least one locking hole and located above the at least one locking component, and an end of the button protrudes out of the second base.

According to an embodiment of the present application, the base structure further includes a resilient component disposed between the at least one locking component and the first base.

According to an embodiment of the present application, a positioning hole is formed on a bottom portion of the at least one locking component, and an end of the resilient component is inserted into the positioning hole.

According to an embodiment of the present application, the base structure further includes an abutting component fixed inside the first base and located beneath the at least one locking component, and the resilient component is located between the abutting component and the at least one locking component.

According to an embodiment of the present application, an insertion hole is formed on the first base. A pivoting shaft protrudes from the bottom portion of the second base, and at least a portion of the pivoting shaft is pivotally inserted into the insertion hole.

According to an embodiment of the present application, a plurality of engaging portions are formed on an upper surface of the second base, and the plurality of engaging portions are for engaging with at least one engaging component disposed on a bottom portion of the seat body for allowing the seat body to pivot together with the second base relative to the first base.

According to an embodiment of the present application, the base structure further includes a supporting component connected to a front end of the first base.

According to an embodiment of the present application, the base structure further includes at least one connecting component connected to a rear end of the first base.

In contrast to the prior art, in the present application, when it is desired to adjust an orientation of the seat body, the releasing mechanism can be operated to drive the locking component to disengage from the locking hole for unlocking the second base, i.e., for allowing the second base to pivot relative to the first base, so as to allow the seat body to pivot together with the second base relative to the first base for adjusting the orientation of the seat body. The present application allows a caregiver to place a child into the seat body or to take care of the child sitting in the seat body by adjusting the orientation of the seat body easily. Therefore, the present application can satisfy different demands and provide convenience in use.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

In the following, the present application is further illustrated by way of example, taking reference to the accompanying drawings. Thereof

DETAILED DESCRIPTION

In order to illustrate technical specifications and structural features as well as achieved purposes and effects of the present application, relevant embodiments and figures are described as follows.

In the following detailed description of the preferred embodiments, reference is made to the accompanying drawings which form a part hereof, and in which is shown by way of illustration specific embodiments in which the present application may be practiced. In this regard, directional terminology, such as "top", "bottom", "right", "left", "front", "back", etc., is used with reference to the orientation of the Figure(s) being described. The components of the present application can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is connected to a second device, that connection may be through a direct mechanical connection, or through an indirect mechanical connection via other devices and connections.

Figure 1:
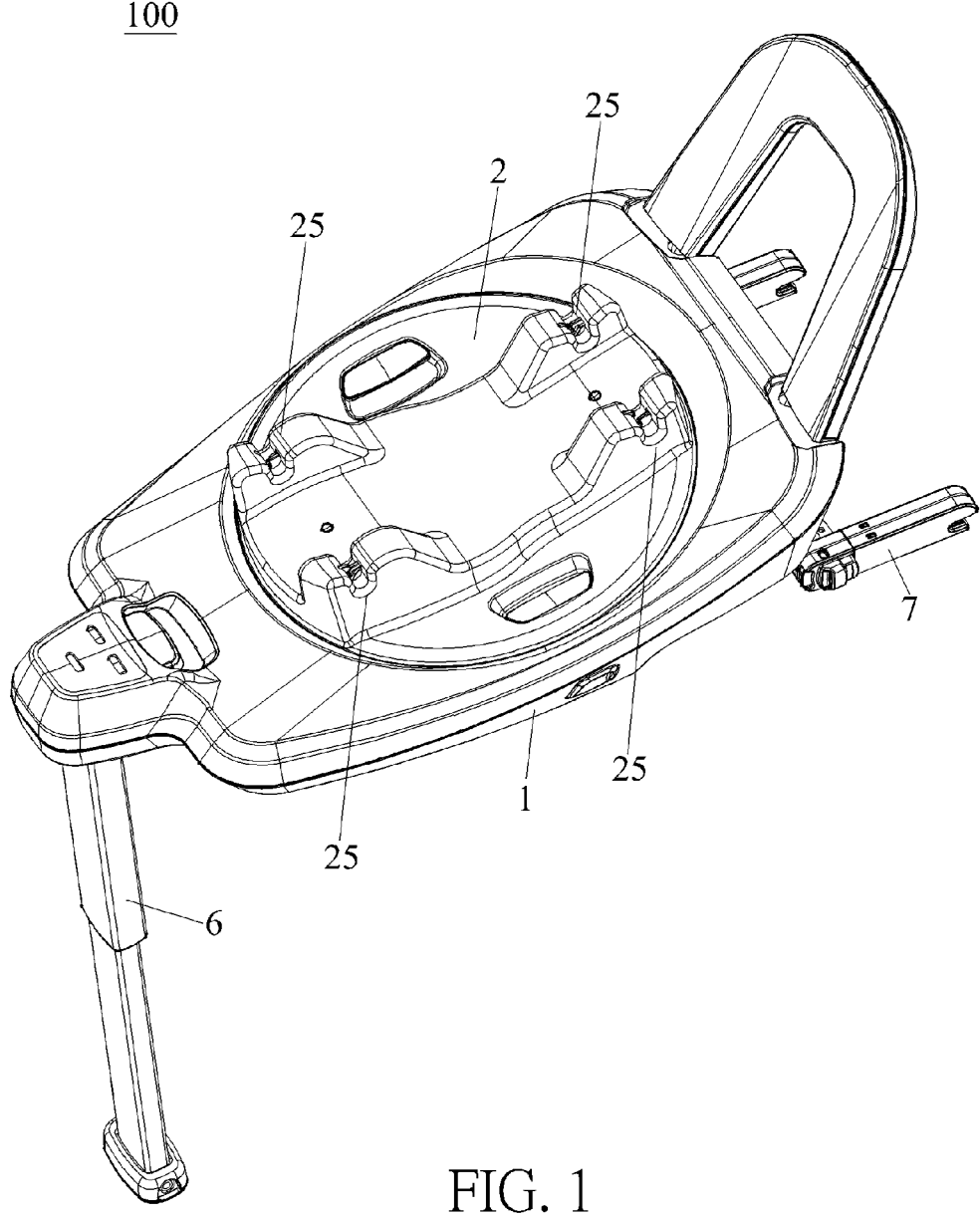
FIG. 1 is a schematic diagram of a base structure according to an embodiment of the present application.
Figure 2:
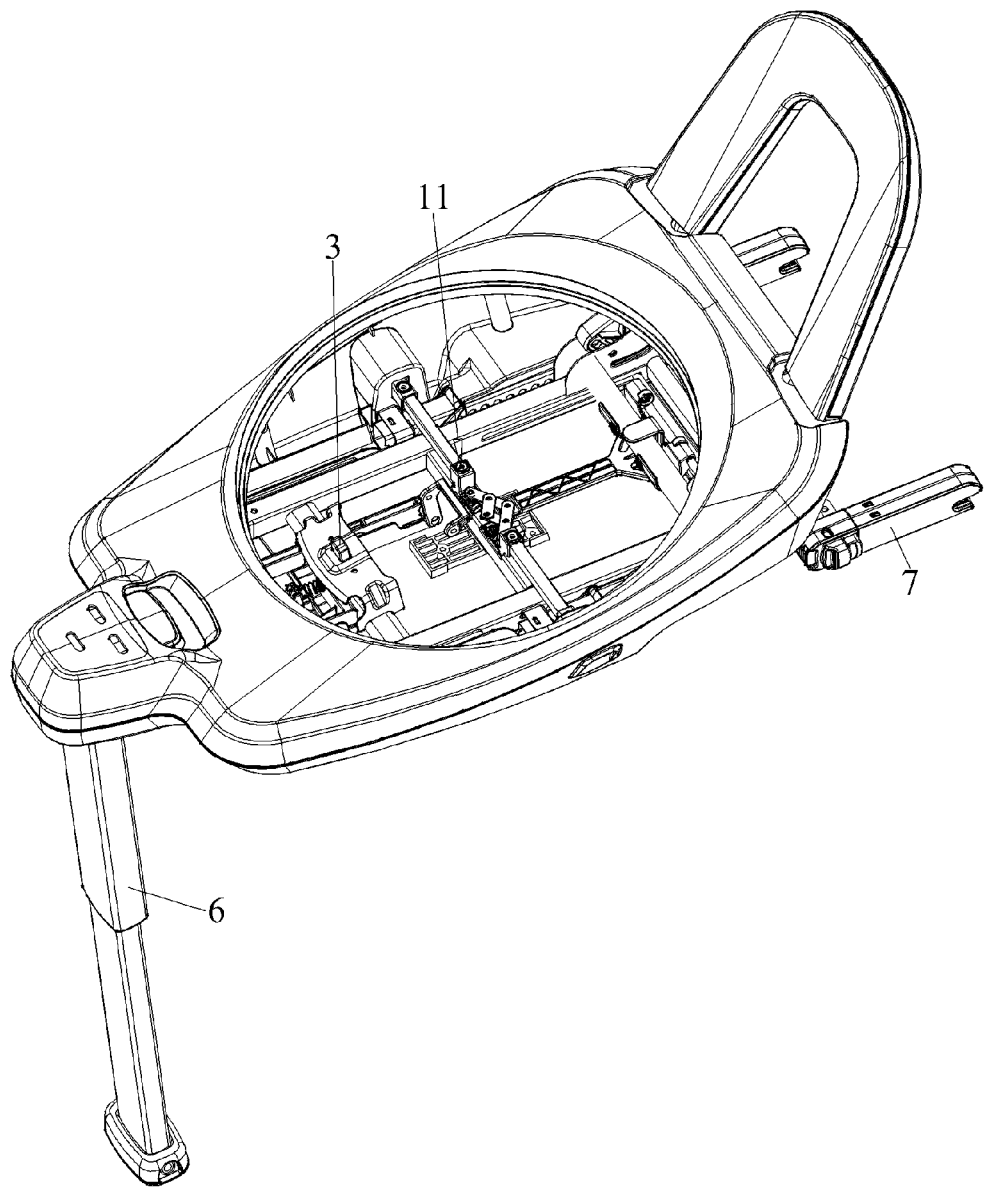
FIG. 2 is a partial diagram of the base structure according to the embodiment of the present application.
Figure 3:
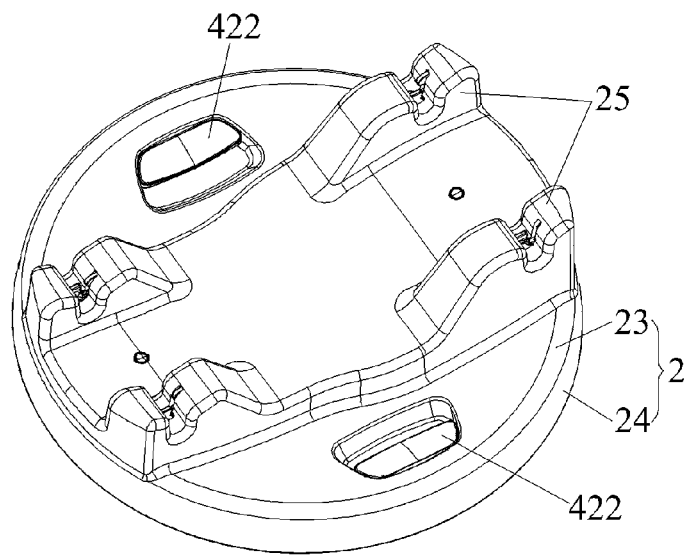
FIG. 3 and FIG. 4 are diagrams of a second base at different views according to the embodiment of the present application.
Figure 4:
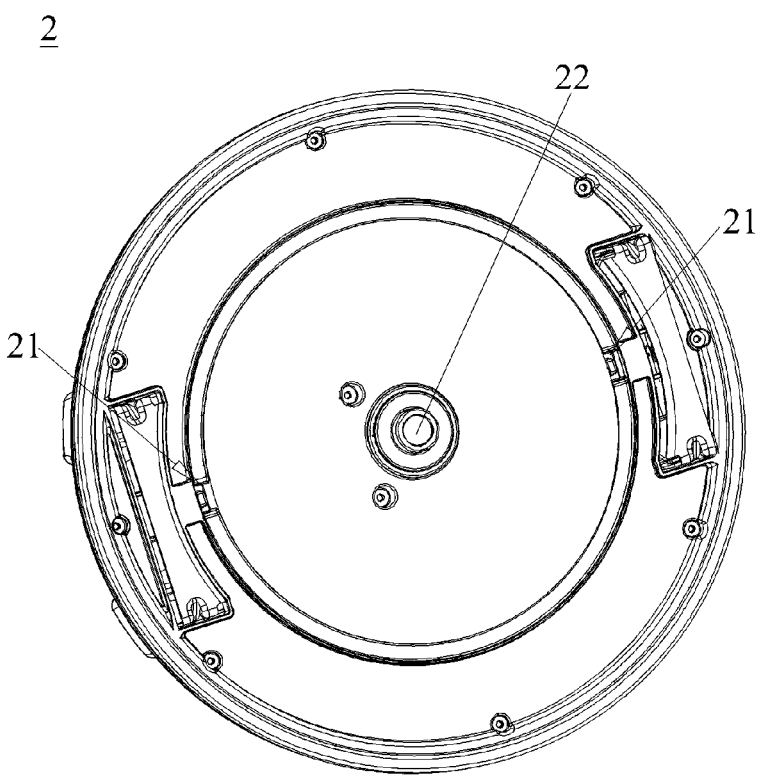
Figure 5:
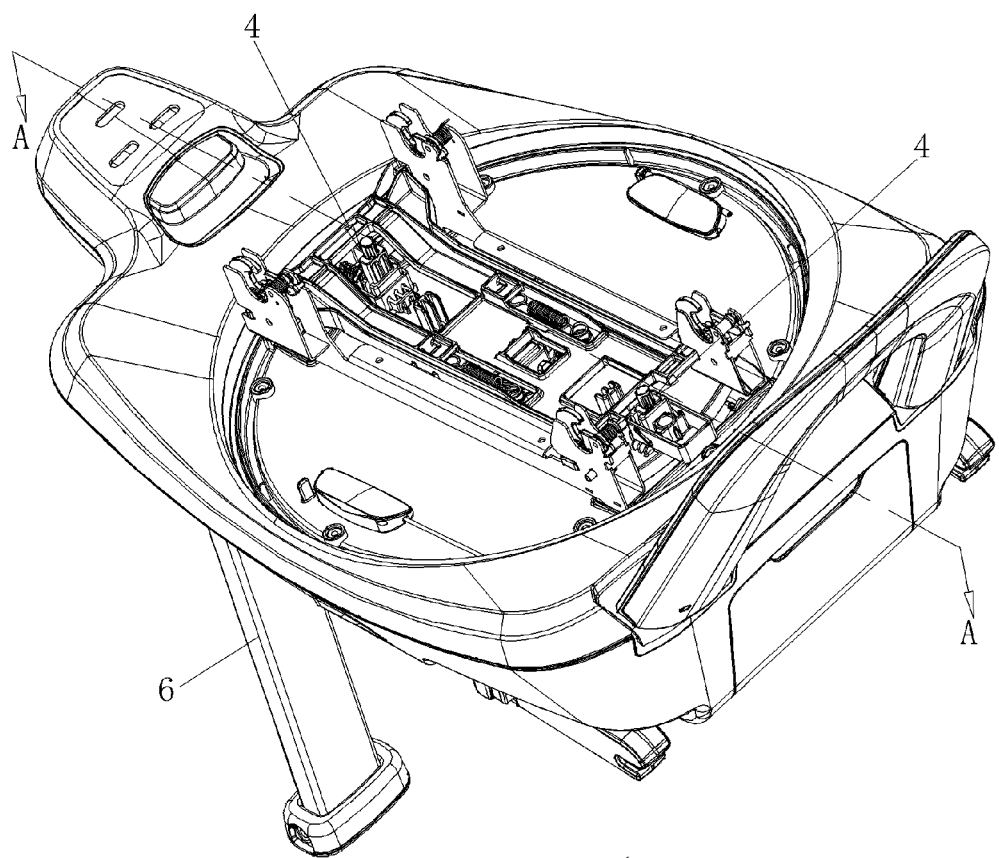
FIG. 5 is another partial diagram of the base structure according to the embodiment of the present application.

Please refer to FIG. 1 to FIG. 5. FIG. 1 is a schematic diagram of a base structure 100 according to an embodiment of the present application. FIG. 2 is a partial diagram of the base structure 100 according to the embodiment of the present application. FIG. 3 and FIG. 4 are diagrams of a second base 2 at different views according to the embodiment of the present application. FIG. 5 is another partial diagram of the base structure 100 according to the embodiment of the present application. As shown in FIG. 1 to FIG. 5, the base structure 100 can be a base of a child safety seat and can cooperate with a seat body of the child safety seat, which is not shown in the figures. The base structure 100 includes a first base 1, the second base 2, a locking component 3 and two releasing mechanisms 4. The second base 2 is pivotally connected to the first base 1 and located above the first base 1. The first base 1 can be disposed on a car. The second base 2 can support the seat body. Two locking holes 21 are formed on a bottom portion of the second base 2 and for cooperating with the locking component 3. Specifically, an insertion hole 11 is formed on the first base 1. A pivoting shaft 22 protrudes from the bottom portion of the second base 2. At least a portion of the pivoting shaft 22 is pivotally inserted into the insertion hole 11 for achieving a pivotal connection of the first base 1 and the second base 2. More specifically, in this embodiment, the second base 2 includes an upper housing 23 and a lower housing 24. The two locking holes 21 are formed on the lower housing 24. The pivoting shaft 22 is located at a bottom portion of the lower housing 24. The upper housing 23 is located above the lower housing 24. The upper housing 23 and the lower housing 24 can be connected to each other by engaging or screwing mechanisms, and an accommodating space is surrounded by the upper housing 23 and the lower housing 24. However, the present application is not limited thereto. For example, in another embodiment, the upper housing and the lower housing can be integrally formed with each other.

An end of the locking component 3 is slidably disposed on the first base 1 along an up-down direction. Another end of the locking component 3 is configured to engage with an end of the corresponding locking hole 21. An end of each of the releasing mechanisms 4 is located inside the second base 2 and slidably disposed inside another end of the corresponding locking hole 21. Each of the releasing mechanisms 4 can drive the locking component 3 to disengage from the corresponding locking hole 21 for unlocking the second base 2, i.e., for allowing the second base 2 to pivot relative to the first base 1, so as to allow the seat body connected to the second base 2 to pivot together with the second base 2 relative to the first base 1 for adjusting an orientation of the seat body. The present application allows a caregiver to place a child into the seat body or to take care of the child sitting in the seat body by adjusting the orientation of the seat body easily. Therefore, the present application can satisfy different demands and provide convenience in use.

Figure 6:
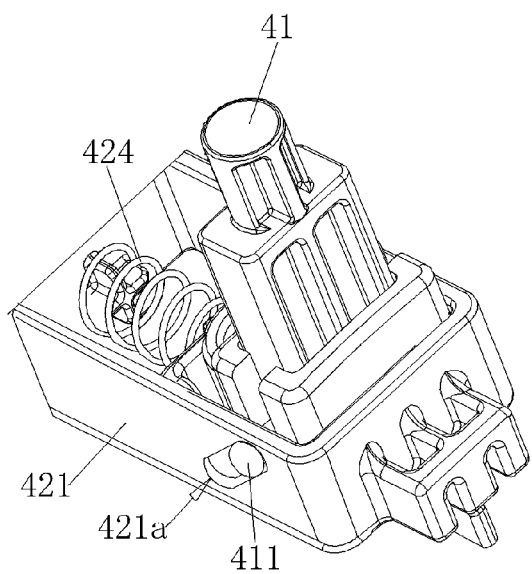
FIG. 6 is a partial diagram of a releasing mechanism according to the embodiment of the present application.
Figure 7:
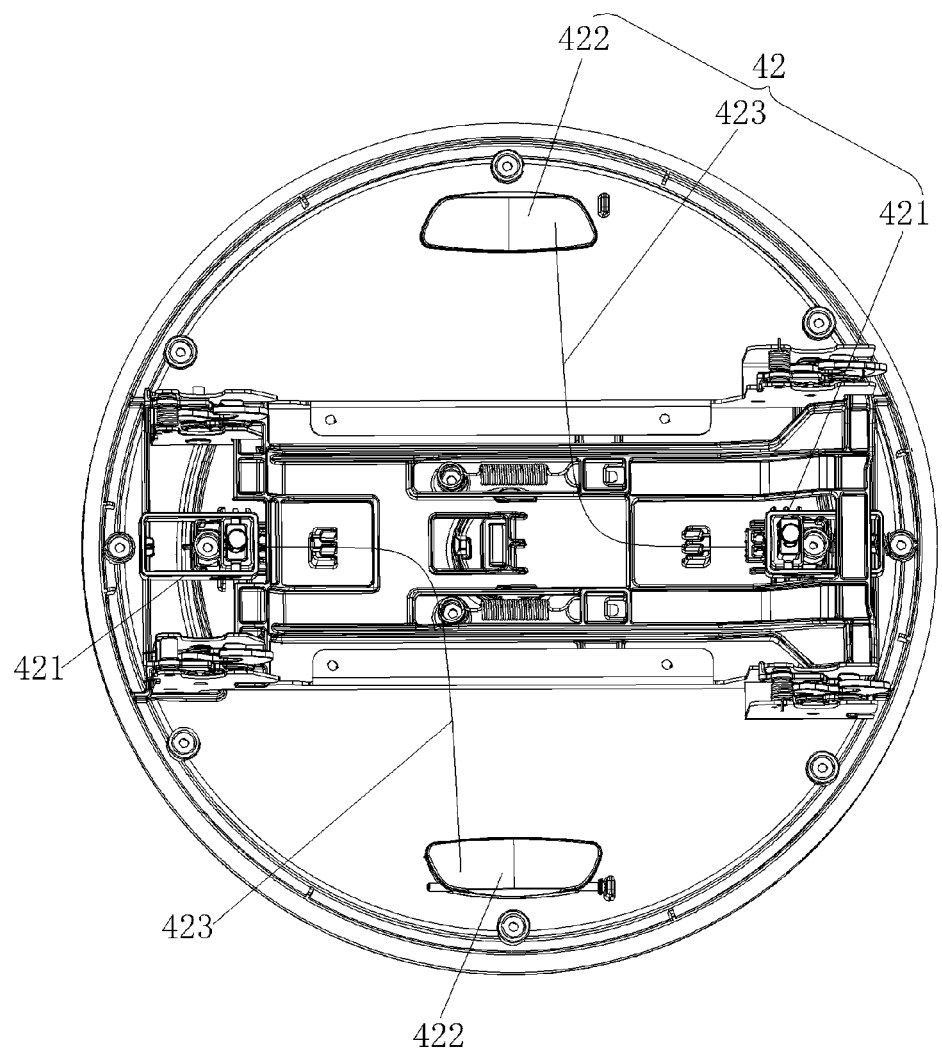
FIG. 7 is a partial top view diagram of the base structure according to the embodiment of the present application.
Figure 8:
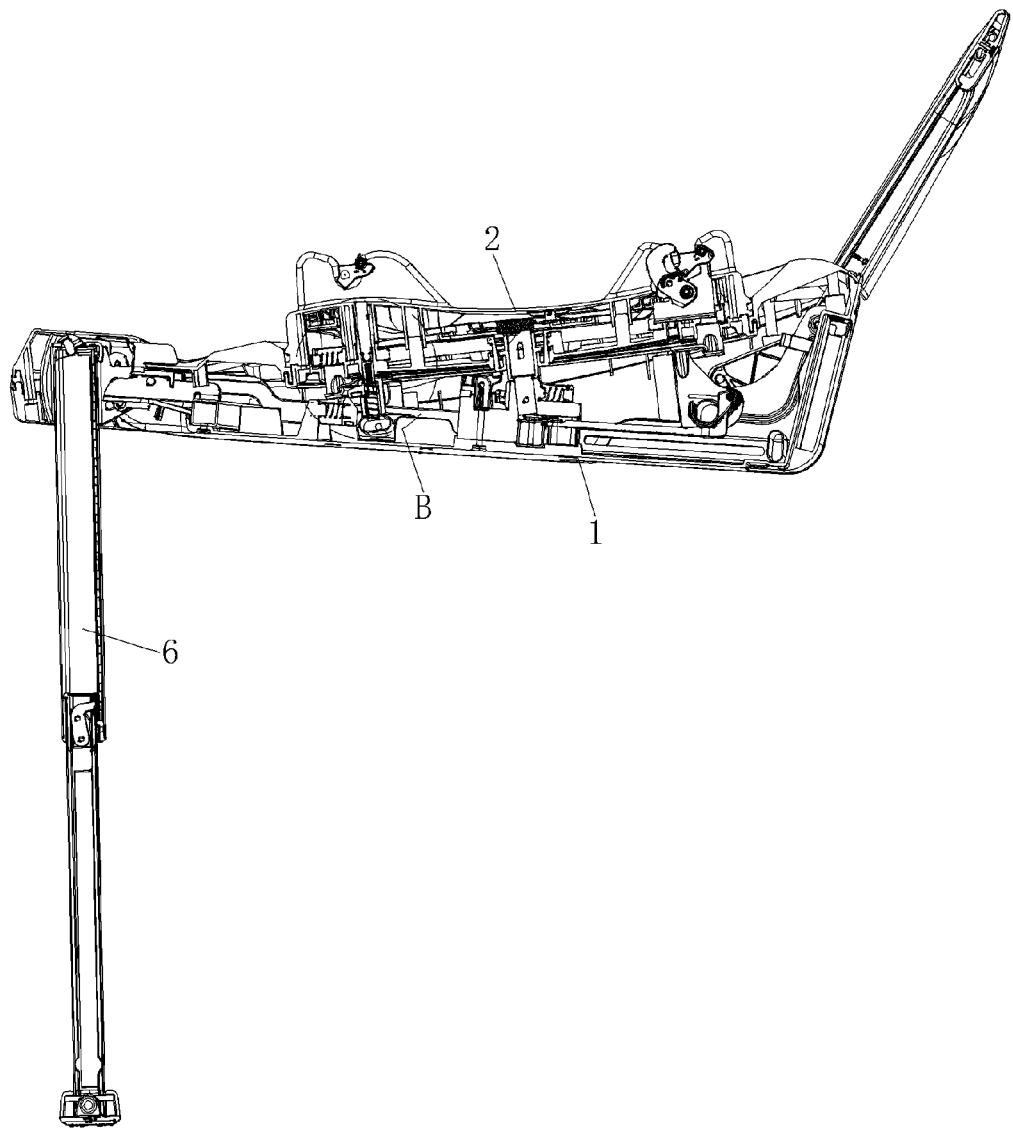
FIG. 8 is a sectional diagram of the base structure along an A-A line shown in FIG. 5 according to the embodiment of the present application.
Figure 9:
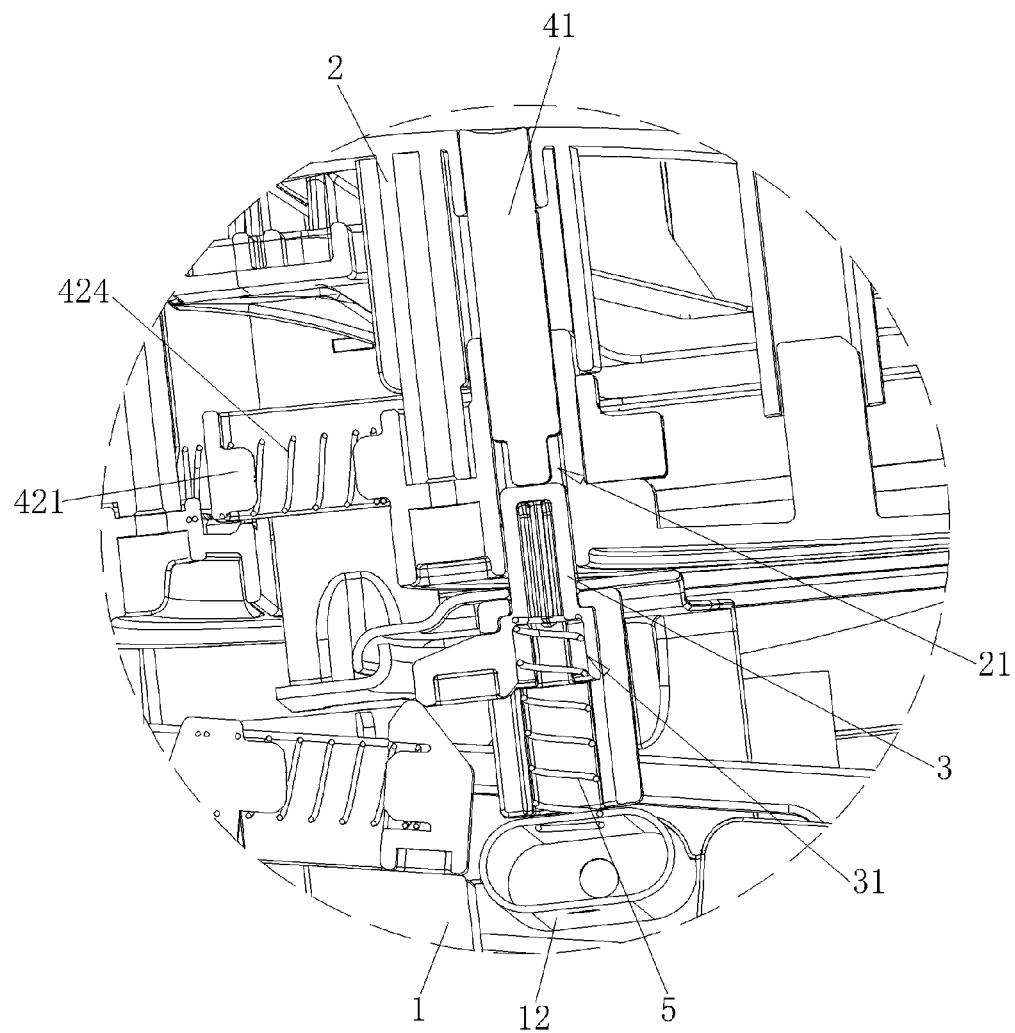
FIG. 9 is an enlarged diagram of a B portion of the base structure shown in FIG. 8 according to the embodiment of the present application.

Please refer to FIG. 6 to FIG. 9. FIG. 6 is a partial diagram of the releasing mechanism 4 according to the embodiment of the present application. FIG. 7 is a partial top view diagram of the base structure 100 according to the embodiment of the present application. FIG. 8 is a sectional diagram of the base structure 100 along an A-A line shown in FIG. 5 according to the embodiment of the present application. FIG. 9 is an enlarged diagram of a B portion of the base structure 100 shown in FIG. 8 according to the embodiment of the present application. As shown in FIG. 6 to FIG. 9, each of the releasing mechanism 4 includes a pushing component 41 and an operating assembly 42. An end of each of the pushing components 41 is slidably disposed inside the corresponding locking hole 21 along the up-down direction and located above the locking component 3. Each of the operating assemblies 42 is disposed on the second base 2. Another end of each of the pushing components 41 is connected to the corresponding operating assembly 42. Each of the operating assemblies 42 can drive the corresponding pushing component 41 to slide along the up-down direction. Specifically, each of the pushing components 41 is located inside the accommodating space surrounded by the upper housing 23 and the lower housing 24 of the second base 2. Each of the operating assemblies 42 can drive the corresponding pushing component 41 to slide along the corresponding locking hole 21 to push the locking component 3 to disengage from the corresponding locking hole 21 for unlocking the second base 2, i.e., for allowing the second base 2 to pivot relative to the first base 1.

However, the present application is not limited to this embodiment. For example, in another embodiment, the releasing mechanism can include a button. An end of the button is slidably disposed inside the locking hole along the up-down direction and located above the locking component. Another end of the button protrudes out of the second base. The caregiver can operate the button to push the locking component to disengage from the locking hole for unlocking the second base by pressing the button downwardly.

As shown in FIG. 6 to FIG. 9, each of the operating assemblies 42 includes a driving component 421, a handle 422 and a linking component 423. Each of the driving components 421 is slidably disposed on the second base 2. A driving inclined slot 421*a* is formed on each of the driving components 421 and for slidably cooperating with the corresponding pushing component 41. Specifically, each of the pushing components 41 includes a cooperating portion 411. Each of the cooperating portions 411 engages with the corresponding driving inclined slot 421*a* and is slidable along the corresponding driving inclined slot 421*a*. Each of the driving components 421 is located inside the second base 2. Each of the handles 422 is pivotally connected to the second base 2. Each of the linking components 423 is connected to the corresponding handle 422 and the corresponding driving component 421. Each of the handles 422 drives the corresponding driving component 421 to slide relative to the second base 2 by the corresponding linking component 423 when each of the handles 422 is operated to pivot. When each of the driving components 421 slides relative to the second base 2, each of the driving components 421 drives the corresponding pushing component 41 to slide downwardly by a sliding cooperation of the corresponding driving inclined slot 421*a* and the corresponding cooperating portion 411, so that the locking component 3 is pushed by the corresponding pushing component 41 to disengage from the corresponding locking hole 21 for unlocking the second base 2, i.e., for allowing the second base 2 to pivot relative to the first base 1.

Preferably, a sliding direction of each of the driving components 421 is substantially perpendicular to a sliding direction of the corresponding pushing component 41. However, the present application is not limited thereto. For example, in another embodiment, the sliding direction of the driving component can be intersected with but not perpendicular to the sliding direction of the pushing component.

Furthermore, each of the operating assembly 42 further includes a recovering component 424 disposed between the corresponding driving component 421 and the second base 2 and for driving the corresponding driving component 421 to recover. Preferably, the recovering component 424 can be a compression spring. However, the present application is not limited thereto. Each of the recovering components 424 is resiliently compressed by the corresponding driving component 421 when each of the handles 422 is operated to pivotally drive the corresponding driving component 421 to slide relative to the second base 2 by the corresponding linking component 423. Each of the driving components 421 is driven to recover by the corresponding recovering component 424 when each of the handles 422 is released.

As shown in FIG. 0.9, the base structure 100 further includes a resilient component 5 disposed between the locking component 3 and the first base 1 and for driving the locking component 3 to recover. Preferably, the resilient component 5 can be a compression spring. However, the present application is not limited thereto. Specifically, the base structure 100 further includes an abutting component 12. The abutting component 12 is fixed inside the first base 1 and located beneath the locking component 3. The resilient component 5 is located between the abutting component 12 and the locking component 3. The resilient component 5 is resiliently compressed by the locking component 3 when the locking component 3 is pushed to disengage from the corresponding locking hole 21 by the corresponding pushing component 41. The locking component 3 is driven to recover to engage with the corresponding locking hole 21 for locking the second base 2 by the resilient component 5 when the second base 2 pivots to align the locking component 3 with the corresponding locking hole 21.

As shown in FIG. 4, in this embodiment, the two locking holes 21 are symmetrically disposed on the bottom portion of the second base 2 relative to the pivoting shaft 22. The locking component 3 is aligned with one of the two locking holes 21 when the seat body is moved to a forward-facing orientation by a pivotal movement of the second base 2 relative to the first base 1. The locking component 3 is aligned with another one of the two locking holes 21 when the seat body is moved to a rearward-facing orientation by the pivotal movement of the second base 2 relative to the first base 1. When the seat body is located in the forward-facing orientation or the rearward-facing orientation, the locking component 3 is aligned with the corresponding locking hole 21. At this moment, the locking component 3 can be driven to recover to engage with the corresponding locking hole 21 by the resilient component 5 for locking the second base 2, i.e., for restraining the second base 2 from pivoting relative to the second base 2. In the present application, the seat body can be quickly switched between the forward-facing orientation and rearward-facing orientation, and therefore, the present application allows the caregiver to place the child into the seat body or to take care of the child sitting in the seat body easily.

As shown in FIG. 1 and FIG. 3, a plurality of engaging portions 25 are formed on an upper surface of the second base 2 and for engaging with at least one engaging component, which is not shown in the figures, disposed on a bottom portion of the seat body for allowing the seat body to pivot together with the second base 2 relative to the first base 1. However, the number of the engaging portion is not limited to four as illustrated in the figures of this embodiment. For example, in another embodiment, there can be only two or three engaging portions formed on the upper surface of the second base.

Besides, as shown in FIG. 1, the base structure 100 further includes a supporting component 6 and two connecting components 7. The supporting component 6 is connected to a front end of the first base 1 and for abutting against a floor of the car. The two connecting components 7 are disposed on a rear end of the first base 1 and for connecting a car seat of the car. Specifically, the connecting component 7 can be an ISOFIX (International Standards Organization FIX) connecting device. However, the present application is not limited thereto. For example, in another embodiment, the base structure can include one connecting component, and the connecting component can be a soft strap.

As shown in FIG. 1 to FIG. 9, operational principle of the base structure 100 is provided as follows. When it is desired to switch the seat body from the forward-facing orientation to the rearward-facing orientation, the caregiver can pivot the corresponding handle 422 to drive the corresponding driving component 421 to slide relative to the second base 2 by the corresponding linking component 423. When the corresponding driving component 421 slides, the corresponding driving component 421 drives the corresponding pushing component 41 to slide downwardly by the sliding cooperation of the driving inclined slot 421a and the corresponding cooperating portion 411, so that the corresponding pushing component 41 pushes the locking component 3 to disengage from the corresponding locking hole 21 located away from a seatback of the seat body for unlocking the second base 2, i.e., for allowing the second base 2 to pivot relative to the first base 1. When the seat body pivots together with the second base 2 relative to the first base 1 to the rearward-facing orientation, the locking component 3 is aligned with the corresponding locking hole 21 located adjacent to the seatback of the seat body. At this moment, the locking component 3 is driven to recover to engage with the corresponding locking hole 21 located adjacent to the seatback of the seat body by the resilient component 5 for locking the second base 2, i.e., for restraining the second base 2 from pivoting relative to the first base 1, so as to position the seat body in the rearward-facing orientation.

Furthermore, when it is desired to switch the seat body from the rearward-facing orientation to the forward-facing orientation, the caregiver can pivot the corresponding handle 422 to drive the corresponding driving component 421 to slide relative to the second base 2 by the corresponding linking component 423. When the corresponding driving component 421 slides, the corresponding driving component 421 drives the corresponding pushing component 41 to slide downwardly by the sliding cooperation of the driving inclined slot 421a and the corresponding cooperating portion 411, so that the corresponding pushing component 41 pushes the locking component 3 to disengage from the corresponding locking hole 21 located adjacent to the seatback of the seat body for unlocking the second base 2, i.e., for allowing the second base 2 to pivot relative to the first base 1. When the seat body pivots together with the second base 2 relative to the first base 1 to the forward-facing orientation, the locking component 3 is aligned with the corresponding locking hole 21 located away from the seatback of the seat body. At this moment, the locking component 3 is driven to recover to engage with the corresponding locking hole 21 located away from the seatback of the seat body by the resilient component 5 for locking the second base 2, i.e., for restraining the second base 2 from pivoting relative to the first base 1, so as to position the seat body in the forward-facing orientation. In the present application, the seat body can be quickly switched between the forward-facing orientation and rearward-facing orientation, and therefore, the present application allows the caregiver to place the child into the seat body or to take care of the child sitting in the seat body easily.

In addition, the present application is not limited to this embodiment. For example, in another embodiment, there can be two locking holes formed on the bottom portion of the second base, and the base structure can include two driving components, one handle, two linking components, one locking component and one resilient component, and each of the linking components is connected between the handle and the corresponding driving component, so that the caregiver can operate the handle to drive the two driving components simultaneously. Alternatively, in another embodiment, there can be two locking holes formed on the bottom portion of the second base, and the base structure can include two driving components, two handles, four linking components, one locking component and one resilient component, and each of the handles is connected to the two driving components by the corresponding two linking components, so that the caregiver can operate one of the handles to drive the two driving components simultaneously. Alternatively, in another embodiment, there can be one locking hole formed on the bottom portion of the second base, and the base structure can include one releasing mechanism, two locking components and two resilient components. The locking hole is for engaging with one of the two locking components selectively. The releasing mechanism can drive the corresponding locking component engaged with the locking hole to disengage from the locking hole.

In contrast to the prior art, in the present application, when it is desired to adjust an orientation of the seat body, the releasing mechanism can be operated to drive the locking component to disengage from the locking hole for unlocking the second base, i.e., for allowing the second base to pivot relative to the first base, so as to allow the seat body to pivot together with the second base relative to the first base for adjusting the orientation of the seat body. The present application allows a caregiver to place a child into the seat body or to take care of the child sitting in the seat body by adjusting the orientation of the seat body easily. Therefore, the present application can satisfy different demands and provide convenience in use.

Those skilled in the art will readily observe that numerous modifications and alterations of the device and method may be made while retaining the teachings of the present application. Accordingly, the present application should be construed as limited only by the metes and bounds of the appended claims.

What is claimed is:

1. A base structure adapted for a seat body of a child safety seat, wherein the base structure comprises:
   a first base;
   a second base pivotally connected to the first base and located above the first base, at least one locking hole being formed on a bottom portion of the second base;
   at least one locking component, the at least one locking component being slidably disposed on the first base, an end of the at least one locking component being configured to engage with an end of the at least one locking hole; and
   at least one releasing mechanism, an end of the at least one releasing mechanism being located inside the second base and slidably disposed inside another end of the at least one locking hole, the at least one releasing mechanism being operated to push the at least one locking component to disengage from the at least one locking hole.

2. The base structure of claim 1, wherein the at least one releasing mechanism comprises a pushing component and an operating assembly, the pushing component is slidably disposed inside the another end of the at least one locking hole and located above the at least one locking component, the operating assembly is disposed on the second base, an end of the pushing component is connected to the operating assembly, and the operating assembly is configured to drive the pushing component to slide.

3. The base structure of claim 2, wherein the operating assembly comprises a driving component, the driving component is slidably disposed on the second base, a driving inclined slot is formed on the driving component and for slidably cooperating with the pushing component, the driving component drives the pushing component to slide to push the at least one locking component by a sliding cooperation of the driving inclined slot and the pushing component when the driving component slides relative to the second base.

4. The base structure of claim 3, wherein a sliding direction of the driving component is perpendicular to a sliding direction of the pushing component.

5. The base structure of claim 3, wherein the operating assembly further comprises a handle and a linking component, the handle is pivotally connected to the second base, the driving component is located inside the second base, the linking component is connected between the handle and the driving component, the handle drives the driving component to slide relative to the second base by the linking component.

6. The base structure of claim 3, wherein the operating assembly further comprises a recovering component disposed between the driving component and the second base.

7. The base structure of claim 1, wherein the at least one releasing mechanism comprises a button, the button is slidably disposed inside the at least one locking hole and located above the at least one locking component, and an end of the button protrudes out of the second base.

8. The base structure of claim 1, further including a resilient component disposed between the at least one locking component and the first base.

9. The base structure of claim 8, wherein a positioning hole is formed on a bottom portion of the at least one locking component, and an end of the resilient component is inserted into the positioning hole.

10. The base structure of claim 1, further including an abutting component fixed inside the first base and located beneath the at least one locking component, and the resilient component being located between the abutting component and the at least one locking component.

11. The base structure of claim 1, wherein an insertion hole is formed on the first base, a pivoting shaft protrudes from the bottom portion of the second base, and at least a portion of the pivoting shaft is pivotally inserted into the insertion hole.

12. The base structure of claim 1, wherein a plurality of engaging portions are formed on an upper surface of the second base, and the plurality of engaging portions are for engaging with at least one engaging component disposed on a bottom portion of the seat body for allowing the seat body to pivot together with the second base relative to the first base.

13. The base structure of claim 1, further including a supporting component connected to a front end of the first base.

14. The base structure of claim 1, further characterized by at least one connecting component connected to a rear end of the first base.

* * * * *